United States Patent [19]

Rosenberg

[11] Patent Number: 4,731,178

[45] Date of Patent: Mar. 15, 1988

[54] CLAMPING BAND FOR SECURING FLANGED MEMBERS TOGETHER

[76] Inventor: Peretz Rosenberg, Moshav Beit Shearim, Israel

[21] Appl. No.: 936,850

[22] Filed: Dec. 2, 1986

[30] Foreign Application Priority Data

Dec. 12, 1985 [IL] Israel ................................ 77317

[51] Int. Cl.⁴ .................. B01D 35/30; F16L 23/00
[52] U.S. Cl. ...................... 210/232; 55/503; 24/522; 24/68 C; 285/408; 210/435; 210/446
[58] Field of Search ............... 55/503; 210/232, 450, 210/445, 435, 446; 24/514, 31 R, 136 L, 68 C, 483, 484, 19, 20 LS, 522; 285/366, 408, 411

[56] References Cited

U.S. PATENT DOCUMENTS

| | | |
|---|---|---|
| 2,727,634 | 12/1955 | O'Meara .............................. 210/445 |
| 2,842,385 | 7/1958 | Webster et al. ..................... 285/408 |
| 3,019,036 | 1/1962 | Stanger ................................ 285/411 |
| 3,164,401 | 1/1965 | Fawkes ................................ 285/408 |
| 3,931,015 | 1/1976 | Jenkins ................................ 210/232 |
| 4,525,274 | 6/1985 | Willus et al. ........................ 210/232 |
| 4,527,818 | 7/1985 | Rundell .............................. 285/411 |
| 4,640,530 | 2/1987 | Abbes et al. ........................ 285/408 |

Primary Examiner—Peter Hruskoci
Assistant Examiner—Linda S. Evans
Attorney, Agent, or Firm—Benjamin J. Barish

[57] ABSTRACT

A clamping band for securing together two flanged members formed with annular flanges, such as a filter housing, comprises an elongated flexible member wrappable about the annular flanges of the two flanged members; a draw bolt and shackle for fixing the ends of the elongated flanged members; and a plurality of flat, rigid inserts receivable on the elongated flexible member and spaced along the length thereof, each of the rigid inserts being formed with a recess on one face, constituting its inner face, for receiving the flanges of the two flanged members.

19 Claims, 6 Drawing Figures

CLAMPING BAND FOR SECURING FLANGED MEMBERS TOGETHER

BACKGROUND OF THE INVENTION

The present invention relates to a clamping band securing flanged members together. The invention is particularly applicable for clamping bands securing together two flanged sections of a housing, such as for a filter, and is therefore described below with respect to this embodiment.

There are many applications requiring the securing together of two flanged members, such as two flanged sections of a filter housing. The conventional clamping band used for this purpose is a metal band applied over the annular flanges of the two housing sections, the metal band being formed with down-turned ends, or flanges, along its opposite edges for engaging the flanges of the housing sections. Such clamping bands, however, must be made to order for the specific dimensions of the housing sections to be secured together. Moreover, such bands must be made of relatively sturdy materials in order to firmly secure two housing sections together. Both of these requirements make these bands relatively expensive to produce.

SUMMARY OF THE INVENTION

An object of the present invention is to provide a clamping band having advantages in the above respects.

According to the present invention, there is provided a clamping band for securing together two flanged members formed with annular flanges, comprising: an elongated flexible member wrappable about the annular flanges of the two flanged members; means for fixing the ends of the elongated flexible members; and a plurality of rigid inserts receivable on the elongated flexible member and spaced along the length thereof, each of the rigid inserts being formed with a recess on one face, constituting its inner face, for receiving the flanges of the two flanged members. Each of the rigid inserts is flat and of very short length relative to the length of the clamping band such that the elongated flexible member of appropriate length and with an appropriate number of such inserts accommodates itself to the curvature of annular flanges of almost any outer diameter.

In one described embodiment, the elongated flexible member includes a flexible band, preferebly of plastic. In a second described embodiment, the elongated flexible member includes a pair of wires, also preferably plastic, passing through openings at the opposite ends of the plurality or rigid inserts. The rigid inserts in both embodiments may also be of plastic.

Clamping bands constructed in accordance with the foregoing features may be manufactured in continuous strips and cut to size according to the dimensions for any particular application. The novel clamping band may therefore be manufactured at substantially lower costs than the clamping bands heretofore used for this purpose.

Further features and advantages of the invention will be apparent from the description below.

BRIEF DESCRIPTION OF THE DRAWINGS

The invention is herein described by way of example only, with reference to the accompanying drawings, wherein.

DESCRIPTION OF PREFERRED EMBODIMENTS

Figure 1:
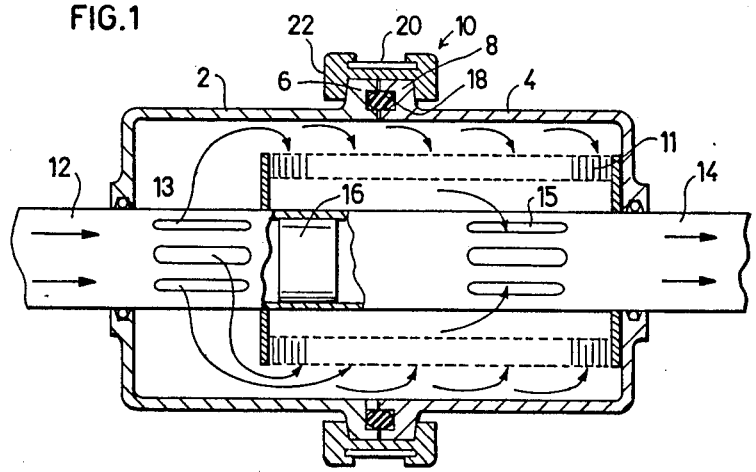
FIG. 1 is a longitudinal sectional view illustrating a filter housing including a clamping band constructed in accordance with the present invention.

FIG. 1 illustrates a filter in which the outer housing is constituted of two sections 2, 4, each formed with an annular flange 6, 8, coupled together by a clamping band, generally designated 10. Except for clamping band 10, the filter may be of a known construction, including a filter body 11 disposed within the housing, an inlet pipe 12 formed with a plurality of openings 13 for inletting the water into the upstream side (outer face) of the filter body 11, and an outlet pipe 14 formed with a plurality of openings 15 for outletting the water after passing through the filter body. A deflector 16 is disposed between openings 13 in the inlet pipe 12, and openings 15 in the outlet pipe 14, for diverting the water inletted via pipe 12 to the outer space of the filtered body 11 as shown by the arrows. A sealing ring 18 is disposed between the abutting faces of the two housing sections 2, 4 secured together by clamping band 10.

Figure 3:
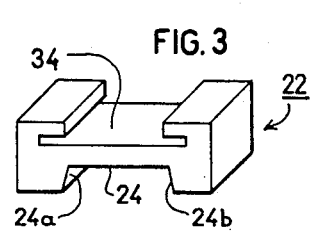
FIG. 3 is a perspective view illustrating the construction of the rigid insert in the clamping band of FIG. 1.
Figure 2:
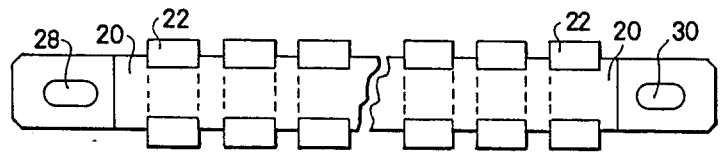
FIG. 2 illustrates the clamping band included in the housing of FIG. 1.

As shown particularly in FIGS. 2 and 3, clamping band 10 is consituted of an elongated flexible member 20 wrappable about the annular flanges 6, 8 of the two housing sections 2, 4, and a plurality of rigid inserts 22 receivable on the elongated flexible member and spaced along the length thereof. Each of the rigid inserts 22 is formed with a recess 24 on one face, constituting the inner face of the clamping band, for receiving the flanges 6, 8 of the two housing sections 2, 4. The opposite ends of the elongated flexible member 20 are secured together by a draw bolt arrangement shown in FIG. 4, including a shackle 26 received over a pair of pins 28, 30 secured to the opposite ends of the flexible member 20, one end of shackle 26 being threaded to receive a bolt 32 bearing against one of the pins 30 for drawing the two ends of the flexible member together in order to tighten it on the end of the flanges 6, 8.

As shown particularly in FIGS. 1 and 3, recess 24 formed on the inner face of the rigid inserts 22 includes tapered side walls 24a, 24b (FIG. 3) diverging in the direction towards the inner face of the insert, so as to firmly engage the annular flanges 6, 8 (FIG. 1) and urge them together when the clamping band is firmly secured in place. Flexible band 20 is received within further recesses 34 formed in the opposite faces of the rigid inserts 22, these further recesses being shaped to enclose the opposite edges of the flexible band.

Flexible band 20 and the rigid inserts 22 are preferably made of plastic material, although one or both could also be made of metal. Both the flexible band 20 and the rigid inserts 22 may be made in continuous strips and cut to the desired length according to the specific application. When applying the clamping band, the flexible band 20 is passed through recesses 34 in the rigid inserts 22, and the inserts are spaced along the length of the band as illustrated in FIG. 2 before the band is clamped over the flanges 6, 8 of the filter housing sections 2, 4, following which the clamping band is tightened by threading bolts 32 in shackle 26 (FIG. 4) for fixing and tightening the opposite ends of the clamping band.

It will thus be seen that the flexible band 20 imparts the flexibility in order to permit the clamping band to be wrapped around the annular flanges 6, 8 of the two housing sections 2, 4, or other pair of flanged members to be secured together, whereas the inserts 22 provide the rigidity for firmly securing the annular flanges together.

As clearly seen in the drawings, particularly FIG. 3, each of the inserts 22 is flat and is of very short length relative to the overall length of the clamping band. Thus, the clamping band construction is substantially universally applicable to annular flanges of almost any diameter since the flexible band 20, of appropriate length and with an appropriate number of inserts 22, accommodates itself to the curvature of an annular flange of almost any outer diameter.

Figure 5:
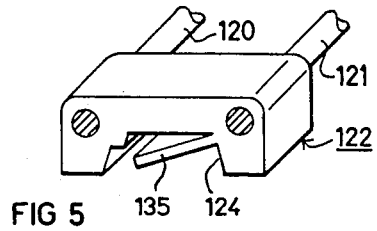
FIG. 5 is a fragmentary view illustrating the construction of another form of clamping band in accordance with the present invention.

FIG. 5 illustrates a variation, wherein the elongated flexible member, instead of being a flexible band (20) as described above, is rather in the form of a pair of flexible wires 120, 121 passed through a pair of openings at the opposite ends of the rigid inserts 122. The inner face of the flat, rigid inserts 122 is provided with a recess 124, preferably including tapered side walls as recess 24 in the embodiment of FIGS. 1–3, for receiving the abutting flanges of the two members to be secured by the clamping band.

Figure 4:
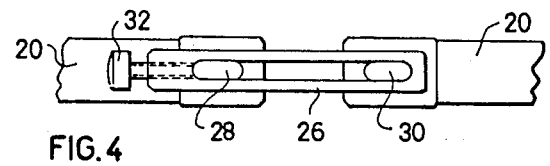
FIG. 4 is a fragmentary view illustrating one manner for fixing the ends of the clamping band of FIGS. 1-3.
Figure 6:
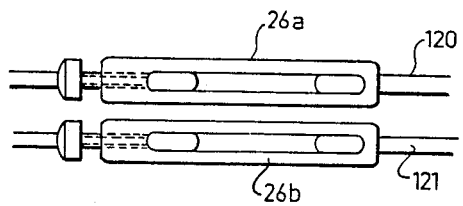
FIG. 6 is a fragmentary view illustrating one manner for fixing the ends of the clamping band of FIG. 4.

The opposite ends of the two wires 120, 121 may be secured by a common securing member, such as the draw bolt arrangement illustrated ni FIG. 4. Preferably, however, the opposite ends of each of the two wires 120, 121 is secured by a separate securing means, such as the above-mentioned draw bolt arrangement of FIG. 4, so that one of these securing means may be opened and the respective wire removed, thereby allowing the inserts 122 to be pivoted about the other wire in order to permit detachment of one housing section from the other without actually removing the clamping band. FIG. 6 illustrates the foregoing manner for fixing the ends of the two wires 120, 121, each wire being fixed by a draw bolt, shown at 26a and 26b, respectively, similar to the draw bolt arrangement illustrated in FIG. 4.

FIG. 5 illustrates a further variation that may be included, wherein each of the rigid inserts 122 is provided on its inner face with a resilient tongue 135 normally pressed against the annular flanges of the two members secured together when the clamping band is in place, but effective when one wire is opened (wire 120 in FIG. 5), to pivot the respective rigid member 122 about the other wire (wire 121). Thus, this modification as illustrated in FIG. 5 automatically pivots the rigid inserts 122 to their open positions when one wire (wire 120) is removed, to allow detachment of one of the housing sections (that facing wire 120) from the other housing section (that facing wire 121).

While the invention has been described with respect to two preferred embodiments, it will be appreciated that these are described merely for purposes of example. Thus, the means for fixing the ends of the elongated flexible members (the flexible band 20 in FIGS. 1–3 or the flexible wires 120, 121 in FIG. 5) may be toggle mechanisms or other devices as presently known in clamping bands. Further, the clamping bands may be used for clamping together flanged discs of other flanged members.

Many other variations, modifications and applications of the invention will be apparent.

What is claimed is:

1. A clamping band for securing together two flanged members formed with annular flanges, comprising:
   an elongated flexible member wrappable about the annular flanges of said two flanged members;
   means for fixing the ends of said elongated flexible member;
   and a plurality of rigid inserts receivable on said elongated flexible member and spaced along the length thereof, each of said rigid inserts being formed with a recess on one face, said recess constituting the inner face of the rigid insert, for receiving the flanges of said two flanged members;
   each of said rigid inserts being flat and of sufficiently short length relative to the length of the clamping band such that said elongated flexible member of appropriate length, and with an appropriate number of said inserts, can be used with annular flanges of almost any outer diameter.

2. The clamping band according to claim 1, wherein said recess is formed with tapered side walls diverging in the direction towards said inner face of the insert.

3. The clamping band according to claim 1, wherein said elongated flexible member includes a flexible band.

4. The clamping band according to claim 3, wherein the outer face of each of said rigid inserts is formed with a second recess for receiving said flexible band.

5. The clamping band according to claim 4, wherein said second recess is shaped to enclose the opposite edges of said flexible band.

6. The clamping band according to claim 1, wherein said elongated flexible member includes a pair of flexible wires passing through openings at the opposite ends of said plurality of rigid inserts.

7. The clamping band according to claim 6, wherein said means for fixing includes a separate means for each of said wires for fixing the ends of the wire, whereby the separate means of one of said wires may be separately opened to permit pivoting the rigid inserts above the other of said wires in order to allow detachment of one of said flanged members from the other without removing the clamping band from other said flanged member.

8. The clamping band according to claim 7, wherein each of said rigid inserts includes, on its inner face, a resilient tongue normally pressed against the annular flanges of the two flanged members secured together when the clamping band is in place, said tongue being effective, when said one wire is opened, to pivot the respective rigid member above the other wire in order to detach said one flanged member from the other.

9. The clamping band according to claim 1, wherein said means for fixing the ends of said elongated flexible member comprises a draw bolt secured to one end received in a threaded socket secured to the opposite end.

10. The clamping band according to claim 1, wherein said elongated flexible member is plastic.

11. The clamping band according to claim 1, wherein said rigid inserts are plastic.

12. A clamping band for securing together two flanged members formed with annular flanges, comprising:
   an elongated flexible member wrappable about the annular flanges of said two flanged members;

means for fixing the ends of said elongated flexible member, said means for fixing comprising a draw bolt secured to one end received in a threaded socket secured to the opposite end;

and a plurality of rigid inserts receivable on said elongated flexible member and spaced along the length thereof, each of said rigid inserts being formed with a recess on one face, said recess constituting the inner face of the rigid insert, for receiving the flanges of said two flanged members;

each of said rigid inserts being flat and of sufficiently short length relative to the length of the clamping band such that said elongated flexible member of appropriate length, and with an appropriate number of said inserts, can be used with annular flanges of almost any outer diameter.

13. The clamping band according to claim 12, wherein said recess is formed with tapered side walls diverging in the direction towards said inner face of the insert.

14. The clamping band according to claim 12, wherein said elongated flexible member includes a flexible band.

15. The clamping band according to claim 14, wherein the outer face of each of said rigid inserts is formed with a second recess for receiving said flexible band.

16. The clamping band according to claim 12, wherein said elongated flexible member includes a pair of flexible wires passing through openings at the opposite ends of said plurality of rigid inserts.

17. The clamping band according to claim 16, wherein said means for fixing includes a separate means for each of said wires for fixing the ends of the wire, whereby the separate means of one of said wires may be separately opened to permit pivoting the rigid inserts above the other of said wires in order to allow detachment of one of said flanged members from the other without removing the clamping band from other said flanged member.

18. A housing for a device including a pair of housing sections, each formed with an annular flange, and a clamping band for securing together said annular flanges, said clamping band comprising:

an elongated flexible member wrappable about the annular flanges of said two housing sections;

means for fixing the ends of said elongated flexible member;

and a plurality of rigid inserts receivable on said elongated flexible member and spaced along the length thereof, each of said rigid inserts being formed with a recess on one face, said recess constituting the inner face of the rigid insert, for receiving the flanges of said two housing sections;

each of said rigid inserts being flat and of sufficiently short length relative to the length of the clamping band such that an elongated flexible member of appropriate length, and with said appropriate number of said inserts, can be used with annular flanges of almost any outer diameter.

19. The housing according to claim 18, further including a filter within said housing.

* * * * *